(12) United States Patent
Martin et al.

(10) Patent No.: US 8,843,316 B2
(45) Date of Patent: Sep. 23, 2014

(54) METHOD TO GEO-TAG STREAMING MUSIC

(75) Inventors: Daryl Joseph Martin, Kitchener (CA); Conor Michael O'Neill, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/345,867

(22) Filed: Jan. 9, 2012

(65) Prior Publication Data

US 2013/0179072 A1 Jul. 11, 2013

(51) Int. Cl.
*G01C 21/34* (2006.01)

(52) U.S. Cl.
USPC ........... 701/487; 701/409; 701/426; 701/437; 701/533

(58) Field of Classification Search
USPC ............. 348/231.3; 701/409, 426, 437, 487
See application file for complete search history.

(56) References Cited

U.S. PATENT DOCUMENTS

| | | | |
|---|---|---|---|
| 6,859,485 B2 * | 2/2005 | Belcher ........................ | 375/130 |
| 6,914,626 B2 * | 7/2005 | Squibbs ..................... | 348/231.3 |
| 7,574,187 B2 * | 8/2009 | Hyatt et al. ................... | 455/270 |
| 7,847,729 B2 * | 12/2010 | Tysowski et al. ........ | 342/357.62 |
| 2007/0204227 A1 * | 8/2007 | Kretz ............................ | 715/727 |
| 2007/0250716 A1 * | 10/2007 | Brunk et al. .................. | 713/176 |
| 2007/0293183 A1 * | 12/2007 | Marlowe ....................... | 455/345 |
| 2008/0156173 A1 * | 7/2008 | Bauer ............................. | 84/601 |
| 2009/0063975 A1 * | 3/2009 | Bull et al. ..................... | 715/716 |
| 2009/0115862 A1 * | 5/2009 | Andersson ................. | 348/222.1 |
| 2009/0143977 A1 | 6/2009 | Beletski et al. | |
| 2009/0171579 A1 * | 7/2009 | Wu et al. ....................... | 701/211 |
| 2009/0222482 A1 * | 9/2009 | Klassen et al. ............. | 707/104.1 |
| 2009/0326949 A1 * | 12/2009 | Douthitt et al. ............... | 704/260 |
| 2010/0114934 A1 * | 5/2010 | Martensson .................. | 707/769 |
| 2010/0131642 A1 * | 5/2010 | Chalikouras et al. ........ | 709/224 |
| 2010/0145971 A1 * | 6/2010 | Cheng et al. .................. | 707/759 |
| 2010/0150276 A1 * | 6/2010 | Yew et al. ..................... | 375/340 |
| 2010/0153386 A1 * | 6/2010 | Tysowski ..................... | 707/736 |
| 2011/0035284 A1 * | 2/2011 | Moshfeghi ................ | 705/14.58 |
| 2011/0079639 A1 * | 4/2011 | Khan ........................... | 235/375 |
| 2011/0136502 A1 * | 6/2011 | Hubner et al. ............ | 455/456.1 |
| 2011/0159885 A1 | 6/2011 | Song et al. | |
| 2011/0165888 A1 * | 7/2011 | Shuman et al. ............ | 455/456.1 |
| 2011/0225151 A1 * | 9/2011 | Annambhotla et al. ...... | 707/724 |
| 2011/0231745 A1 * | 9/2011 | Levesque et al. ............ | 715/202 |
| 2011/0264495 A1 * | 10/2011 | Hailey et al. .............. | 705/14.16 |
| 2011/0320020 A1 * | 12/2011 | Price .............................. | 700/94 |
| 2012/0013767 A1 * | 1/2012 | D'Souza et al. ............ | 348/231.3 |
| 2012/0046042 A1 * | 2/2012 | Son ............................ | 455/456.1 |
| 2012/0050185 A1 * | 3/2012 | Davydov et al. ............. | 345/173 |
| 2012/0051543 A1 * | 3/2012 | Evans et al. ................... | 380/270 |

(Continued)

FOREIGN PATENT DOCUMENTS

WO 2010/043425 A1 4/2010

*Primary Examiner* — Calvin Cheung
(74) *Attorney, Agent, or Firm* — Fitch, Even, Tabin & Flannery LLP

(57) ABSTRACT

Songs titles and song artists or other content received on an HD-radio are cross-referenced to one or more geographic locations where they were heard on the radio by identifying a song title or artist in the HD radio data stream and instructing a global positioning system navigation unit to contemporaneously determine its location. The determined location and song title and/or artist are cross-referenced to each other in a list or database. A touch-sensitive display device is configured to display the location or portion of a route where a listened-to song was heard. Song titles and/or artists can be determined by tactile selection of portions of a route displayed on the map.

9 Claims, 4 Drawing Sheets

| time | COORDINATES | title |
|---|---|---|
| t1 | Lat 1; Long 1 | title 1 |
| t2 | Lat 2; Long 2 | title 2 |
| t3 | Lat 3; Long 3 | title 3 |
| ⋮ | ⋮ | ⋮ |
| tn | Lat n; Long n | title n |

(56) References Cited

U.S. PATENT DOCUMENTS

| | | | |
|---|---|---|---|
| 2012/0105279 A1* | 5/2012 | Brown et al. | 342/357.24 |
| 2012/0213493 A1* | 8/2012 | Luo et al. | 386/248 |
| 2012/0221687 A1* | 8/2012 | Hunter et al. | 709/219 |
| 2013/0004014 A1* | 1/2013 | Hickman | 382/100 |
| 2013/0068085 A1* | 3/2013 | Yoshikawa | 84/645 |
| 2013/0132836 A1* | 5/2013 | Ortiz | 715/716 |
| 2013/0173753 A1* | 7/2013 | Marovets | 709/219 |
| 2013/0318114 A1* | 11/2013 | Emerson, III | 707/758 |

* cited by examiner

METHOD TO GEO-TAG STREAMING MUSIC

The present disclosure relates generally to a manner by which to identify information. More particularly, the present disclosure relates to a system, method, and apparatus for geo-tagging streaming data.

BACKGROUND

Hybrid digital radio or "HD Radio" is well known. It permits AM and FM broadcast stations to send program material as a digital data stream and as an analog signal, at the same time. HD radio thus allows radio stations to "multicast" or transmit digital and analog signals, at the same time.

The ability to transmit digital data gives HD radio the ability to provide data services such as vehicle traffic messages, the name of the station to which a listener is tuned to, and, information about content being broadcast from the station. Information about content being broadcast typically include song title and/or the name of an artist.

Internet streaming and satellite radio also have the ability to provide program content that includes music while simultaneously streaming data that can include vehicle traffic messages, the name of the station to which a listener is tuned to, and, information about content being broadcast from the station. Portable communications devices, such as the Blackberry® from Research In Motion, have the ability to wirelessly receive streaming data.

Many drivers who listen to music on an HD car radio while driving and, individuals who listen to music or other content via a wireless communications device, sometimes hear a song or other content that might be liked but they have no idea who the artist is or the name of the particular song. Computer programs exist which try to identify a particular song by sampling the audio and comparing against a database, however, such programs require their purchase and are time consuming to use.

DETAILED DESCRIPTION

Figure 1:
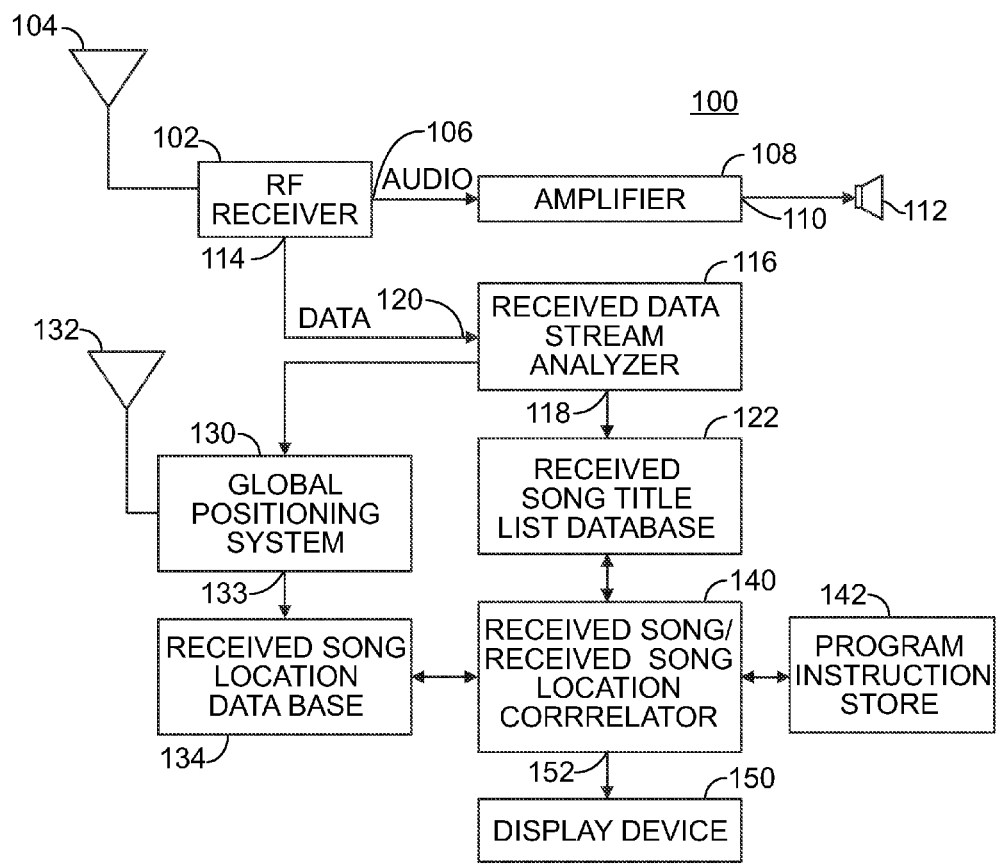
FIG. 1 is a block diagram representation of a system by which streaming music on an HD radio can be geo-tagged.

FIG. 1 is a block diagram representation of a system 100 by which streaming music on an HD radio can be geo-tagged. As used herein, the term "geo-tag" should be construed to mean the identification of a song title and/or its author and/or a performing artist, to a geographic location where the song was received on an HD radio, a geographic location being identified by latitude and longitude coordinates.

Geo-tagging includes the ability to store one or more song titles, authors or performing artist with the geographic location where the song was received on an HD radio, as either separate character strings, separated by commas, spaces or other ASCII characters, or as one continuous string that includes field separators such as commas. Geo-tagging also includes the indexing, retrieval of the song title by location or the location by the song title and the selective display of a route over which an HD radio traveled during which songs were received, the titles recovered and stored and indexed. Geo-tagging also includes the storage, indexing and retrieval of a radio station call sign or call letters assigned to it by governmental agencies such as the U.S. Federal Communications Commission, and its licensed radio frequency.

The system 100 depicted in FIG. 1 is comprised of an HD radio receiver 102, which receives radio frequency signals from a conventional antenna 104. The radio receiver 102 recovers data from the RF signal using prior art devices and techniques. Audio that is output from an audio output port 106 of the radio frequency receiver 102. Audio on the port 106 is provided to a conventional audio power amplifier 108. The output 110 of the amplifier 108 is coupled to one or more conventional speakers 112 from which audio content that was recovered from the received radio frequency signal carrier, is available to a user.

In addition to an audio frequency output 106, the HD radio frequency receiver 102 has a data output port 114 from which a serial data steam is output. The serial data output from the data output port 114 is comprised of data recovered from the HD radio frequency signal. The serial data is provided to a received data stream analyzer 116.

The received data stream analyzer 116 analyzes the serial data stream from the radio frequency receiver 102 and identifies information in that stream. The data that comprises the stream sent to the data stream analyzer most typically includes song titles and an artist performing a song. Data in the data stream sent to the data stream analyzer 116 can also include, however, "meta-data," which is considered herein as including "album art," which is in turn considered to be one or more graphic images or symbols published by the artist or publisher of a song, and which is associated with a song or the album. The data included in the data stream to the data stream analyzer can also include the call letters or call sign of the HD radio station, and/or the radio frequency licensed to the radio station owner/operator by a governmental agency, such as the U.S. Federal Communications Commission. Data in the stream sent to the data stream analyzer can include indicators that identify or signal when a commercial or non-program-content message starts and ends. For brevity, the term "radio station" should be construed as including the call letters/call sign and/or the licensed broadcast frequency" of an HD radio signal provider.

The received data stream analyzer 116 can be embodied as a processor that executes stored program instructions examples of which include a microcontroller or a digital signal processor. It preferably has at least two outputs embodied as data, or it can output at least two different types of signals from a single output port or terminal. For purposes of illustration, a first output 118 is comprised of data representing: song titles and/or names of artists and/or meta-data related to the song, and/or a radio station, which of course the received data stream analyzer 116 identified in the data stream 120 that it receives from the RF receiver 102. Received song titles and/or artists output from the received data stream analyzer 116 are provided to a "received song title list database" 122. Radio station and meta data can be optionally provided to the received song title list data base 122 or to one or more other data bases.

The received song title database list 122 is preferably stored in a computer-readable memory device, examples of which would include magnetic storage media or semiconductor memory devices such as a flash memory device or other electrically alterable memory devices. The insertion of received song titles and/or received artists, radio station information and/or meta-data into the received song title list database 122 can be effectuated by the received data stream analyzer 116 or by another processor or other device not shown and omitted for clarity purposes.

A second output from the received data stream analyzer 116 is a trigger signal 124 to a conventional global positioning system 130 coupled to its own conventional antenna 132. The global positioning system 130 is configured somewhat differently than other GPS systems in that it can be maintained in an idle state until triggered to determine a location of the system 100 responsive to a signal output from the second output 124 of the received data stream analyzer 116. The global positioning system or GPS 130 is thus configured to determine a location of the radio frequency receiver 102 and thus the user where a song is heard, responsive to the detection of a song title and/or artist name in the data 120 received by the receiver 102.

After the global positioning system 130 determines its location responsive to a trigger signal output signal from the received data stream analyzer 116, the global positioning system 130 has an output port or terminal 132 through which it outputs the determined location to a received song location database, which is embodied as either a convention random access memory device, a flash memory or a magnetic media. It can be the same memory device where received song titles are kept. The received song location database is a database or list of locations, determined by the GPS 130, where a song was received by the HD receiver 102 and thus played to a user via the speaker 112. The received song location database 134 stores locations determined by the global positioning system 130 responsive to signals that the GPS receives from the received data stream analyzer 116. The received song location database 134 is thus a list of latitude and longitude coordinates whereat a particular song was received by the receiver and listened to by the user. The received song location data base 135, can also include information pertaining to radio stations from which a song was received ("radio station" data) as well as include meta-data associated with songs, cross-referenced to the latitude and longitude coordinates where such data was received.

A received song/location correlator 140 is coupled to both the received song location database 134 and received song title list database 122. The received song/received song location correlator 140 is configured to cross-reference or index titles of received songs to the various geographic locations that were stored in the received song location data base 134 by the GPS 130. The received song/received song location correlator 140 thus makes it possible to locate a song title in the received in the received song location database 122 by a geographic location at which the song was received by the receiver 102, an artist who performed the song, display a radio station from which it was received and/or display meta-data associated with the song or the album on which the song was "released" by an artist.

The correlator 140 is preferably embodied as a processor, such as a microcontroller or GSP coupled to its own program instruction storage device 142. Program instructions stored in the storage device 142 imbue the correlator 140 with the ability to display information on an associated display device 150 and, to perform the aforementioned cross-referencing.

Referring now to the display device 150, in a preferred embodiment the display device 150 is a conventional touch-sensitive display device. It is capable of both displaying images and detecting on a screen, a touch input, such as a user's finger. Such screens are well-known and commonly used on so called "smart phones." They are also used at airport ticketing kiosks. When the display device 150 receives a tactile input, it outputs a signal 152 to the correlator 140 corresponding to and identifying a location on the touch-sensitive screen where the tactile input was made.

The correlator 140 is configured to generate images of maps and to effectuate or cause the display of those maps on the display device 150. The correlator 140 is also configured to display on the displayed maps, a route over which the radio receiver 102 travelled over a previous time period.

Figure 2:
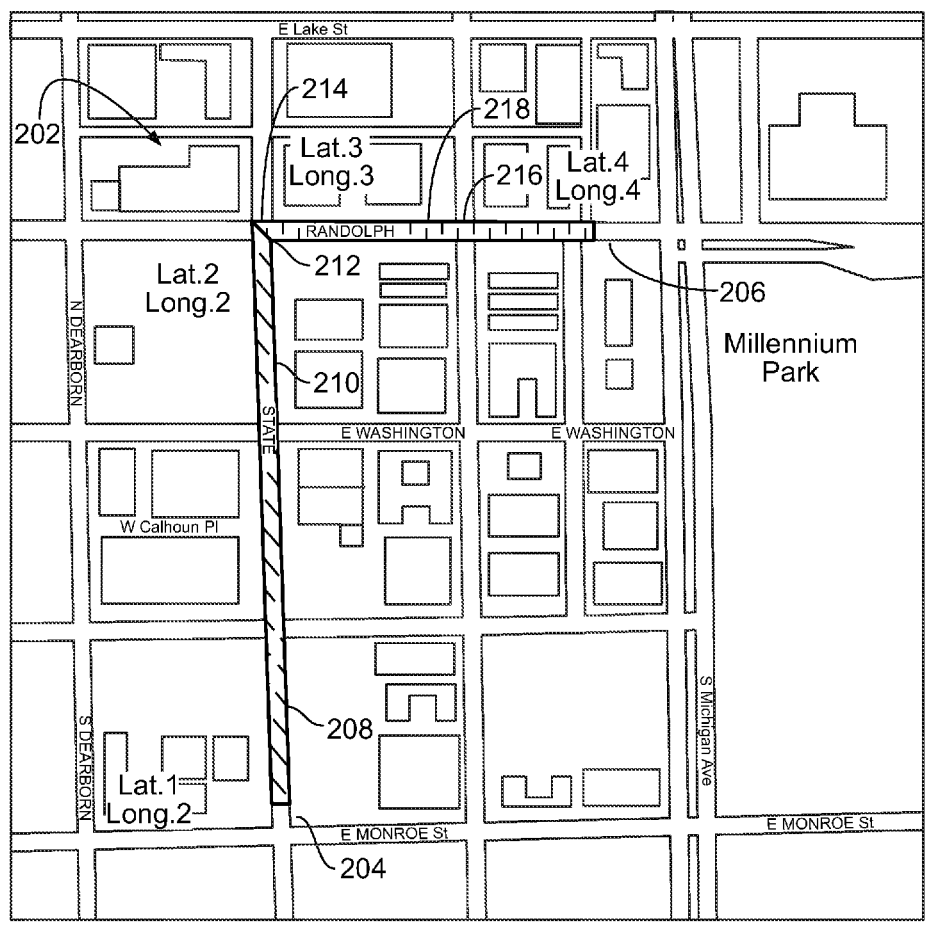
FIG. 2 is a depiction of a map displayed on a display device and which shows a route traversed by a radio as geo-tagging occurs.

FIG. 2 is a depiction of a map 200 displayed on a display device 150. The map 200 displays an example of a route 202 that was travelled by the radio between a starting point 204 and an ending point 206. As shown in FIG. 2, the starting point 204 is displayed on the map 200 by highlighting or an icon proximate to the displayed intersection of South State Street and East Monroe Street. Latitude and longitude coordinates displayed near the intersection specify where a first song was received by the system 100, its included HD radio 102, the names of the songs and/or artist being stored contemporaneously into memory.

A first leg 208 of the route 202 extends northward from East Monroe Street to just south of Randolph as shown by the highlighting on either side of South State Street. Reference numeral 212 identifies a point on the first leg 208 where the first song ended, the end of the first song being detected by the receiver 102 by a new data string identifying a second song title and/or artist. The latitude and longitude where the first song ended and a second song begins is identified by corresponding latitude and longitude coordinates identified in the figure as "Lat. 2" and "Long. 2."

The map 200 shows that the route 202 of the system 100/radio 102 changes direction at the intersection of Randolph Street and State Street and goes eastward to a point just west of Michigan Avenue identified by reference numeral 206. The direction change at the corner of Randolph and State Street is identified as the end of the first leg 208 and has its own latitude and longitudinal coordinates identified as "Lat. 3" and "Long. 3." A second leg of the route is identified by reference numeral 216. The second leg ends at the "Lat. 4" and "Long. 4" coordinates.

The portion of the route 202 over which the second song was received by the receiver is identified by highlighting adjacent the route from the point 212 where the first song ended. The second highlighting 218 thus identifies a portion of the route 202 over which the second song was received by the receiver.

Figures 3, 4:
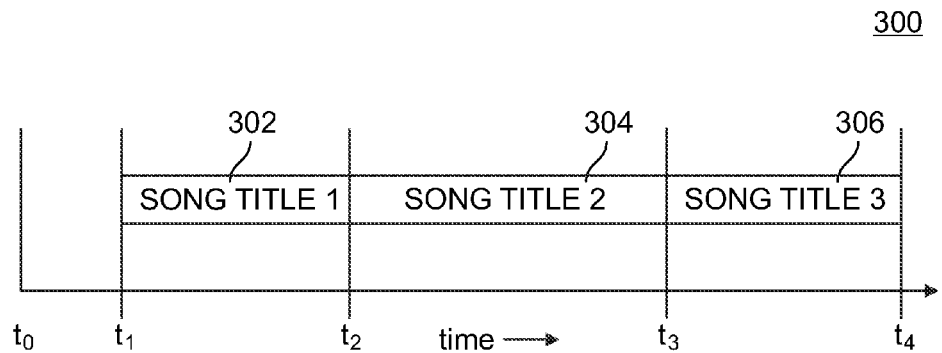
FIG. 3 is a graphical depiction of how different song titles can be received over time.
FIG. 4 is a depiction of a database for storing a list of time entries, cross-referenced or index to a list of coordinates 404, and cross-referenced or indexed to a list of song titles.

FIG. 3 is a graphical depiction 300 of how different song titles might be received from an HD radio broadcast over a finite period of time. At a first time denominated as $t_1$ a first song title 302 is received by the radio frequency receiver 102. The first song has a time duration up until $t_2$. FIG. 3 depicts the immediate commencement of a second song with a second title 304 at $t_2$. The second song lasts until $t_3$ whereat a third song starts with a third song title 306. The third song ends at $t_4$.

For illustration purposes, the songs depicted in FIG. 3 having the corresponding song titles 302, 304, 306 can be considered to have a total play time equal the time required for the radio 122 to traverse the route 202 shown in FIG. 2. The first song having the first song title 302 might be considered to start at the origin 204 and last until the radio reaches the second location identified by Lat 2 and Long 2. The second song with the second song title 304 might be considered to have a duration that will last from the Lat 2, Long 2 location up to the end point 206 of the route 202. Thereafter, the radio can be considered or assumed to stay at the destination point 206.

During the time that song titles are received, the radio is traversing the route 202 and changing locations. The changing location of the system 100/radio 102 over time are determined by the GPS system 130 and stored in memory. The system depicted in FIG. 1 is thus configured to receive a signal with information that comprises at least the title of a song and upon the reception of that information or the song title determine a geographic location. The geographic location or a song starts is written into a database along with the time that it started and the title that was received. The system is further configured to repetitively calculate latitude and longitude for as long as the song continues to play.

When a song terminates or changes, the system 100 is configured to determine at least a second geographic location where a second song starts and to record that location and the song title and the time into the same database. The coordinates or locations over which a song is received is thus stored in a memory device and cross-referenced or indexed against the song title. It is therefore possible to retrieve a song title by referencing portions of the route 202 displayed on the map 200.

FIG. 4 is a depiction of a database 400 storing a list of time entries 402, a list of coordinates 404 and a list of song titles 406. The coordinates 404 are those coordinates of locations along which a song having the title in the title list 406 played along a route. The time of reception is also recorded. The correlator 140 accesses a data base such as the database 400 depicted in FIG. 4 and facilitates retrieval of a song title using geographic coordinates. The song is thus tagged geographically or "geo-tagged."

Figure 5:
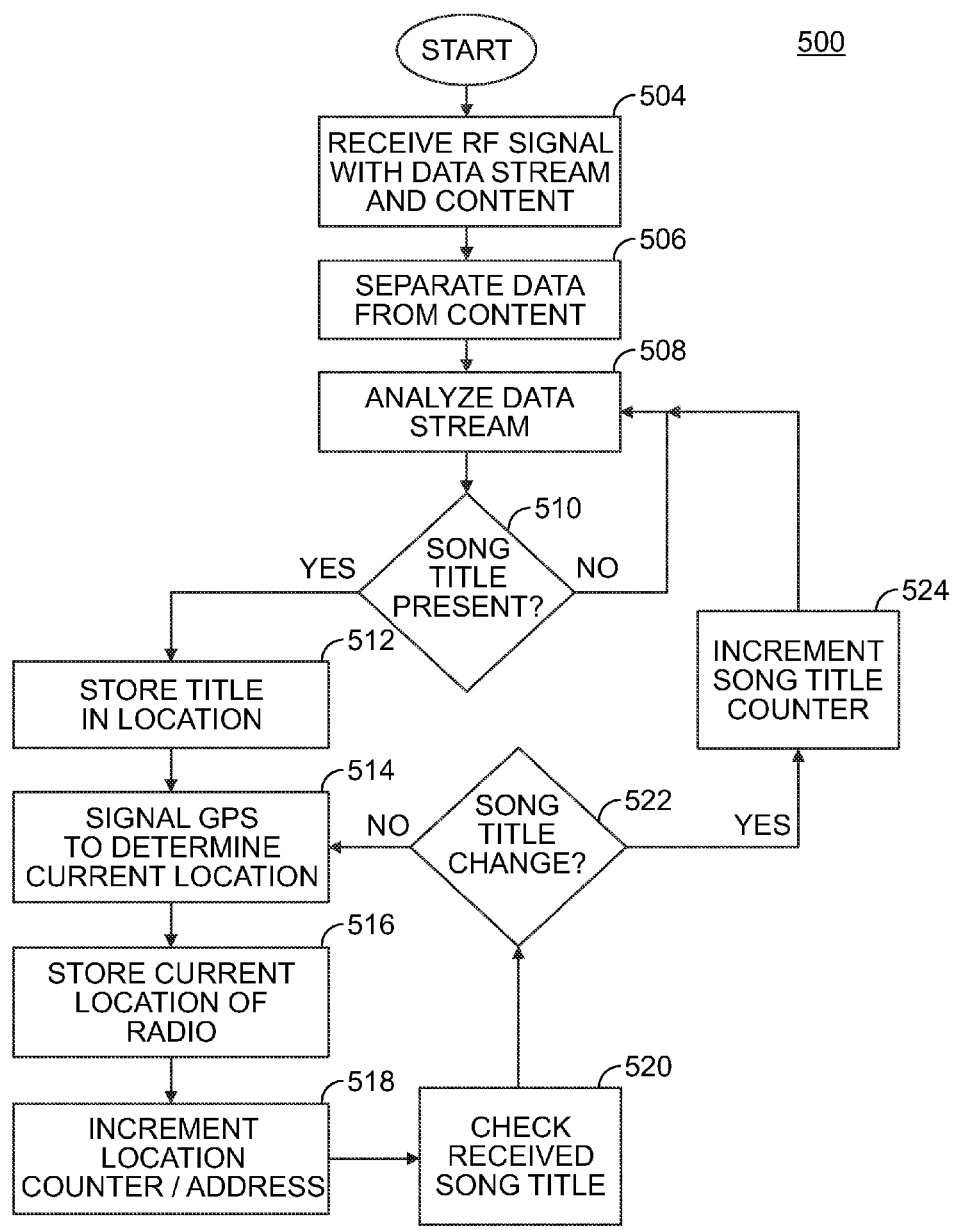
FIG. 5 is a depiction of a method of correlating a song received by a moving radio to one or more geographic locations where the song was received, which is also referred to herein as "geo-tagging."

FIG. 5 is a depiction of a method 500 of geo-tagging or, correlating a song received by a moving radio to one or more locations where the song was received. The method 400 starts at step 504 by the reception of RF signal having a data stream that includes at least a song title and/or artist as described above. As also described above, the radio frequency receiver separates the data stream from content, the content being the music itself which is either encoded into a digital format or in an analog format but nevertheless played backed for reproduction from the speaker 112. At step 508, the data stream is analyzed to detect the presence of strings of characters that identify the song title and/or artist.

At step 510, a decision is made whether the data 120 received by the received data stream analyzer 116 includes a song title, or if some commercial or non-program-content message is being received. If no song title is present, or if a commercial or non-program-content message is being received, program flow returns to step 508. Stated another way, the incoming data is continuously analyzed to detect the presence of a song title and/or artist. If at step 510 a song title is determined to be present, the program proceeds to step 512 where the detected song title is stored in a computer-readable storage medium such as a magnetic disc or semiconductor memory device. As stated above, if it is present in the received data, the name of an artist, associated meta-data and radio station data can also be stored. The organization of the computer-readable storage medium vis-à-vis the song titles, and other information, can be arranged substantially as depicted in FIG. 4.

At step 514, the GPS system 130 receives a signal from the received data stream analyzer 116 which causes the GPS system to determine its current location. At step 516 that location is stored in a computer-readable storage medium.

A counter of song title is maintained by the method depicted in FIG. 5. Such a counter is necessary of course to enable the selection of a title in order or by its coordinates. At step 518 a counter or pointer into a computer-readable storage medium where the song titles are kept is incremented. Thereafter at step 520 the data 120 from the receiver is rechecked to determine if the same song title is present or if it has changed.

If the received song title has not changed, the program flow continues or returns to step 514 where the GPS system re-determines its location. Step 514, 516, 520 and 522 thus provide a continuous stream of locations that are determined for as long as the song title does not change.

When the song title changes, the program control proceeds to step 524 where the song title counter is incremented. Thereafter the program flow returns to step 508 where the incoming data stream is analyzed as described above.

Those of ordinary skill in the art will recognize that program content that includes music and movies can be "streamed" over the Internet. Such content can also be transmitted wirelessly to cell phones and their equivalents during a conventional cell phone connection to a content provider.

Wireless communications devices such as the Blackberry® from Research In Motion and equivalents thereof, have the ability to wirelessly receive streaming data from the Internet but to also receive program content via a "conventional" cell phone connection or "call." Such wireless devices include the ability to receive and process data that accompanies a program content Internet "stream" or a program content "broadcast" via a "conventional" cell phone connection.

Any device that is able to wirelessly receive an Internet data stream that carries program content such as music and which data streams include or are accompanied by data related to the content being received, is considered herein as being a "receiver" of such information and functionally equivalent to an HD radio and, for this disclosure, included within the meaning or scope of the term, "HD radio." Any device that is able to wirelessly receive program content such as music, in either an analog or digital format, and which receives an accompanying data stream that provides data related to the content being received, is also considered herein as being a "receiver" and equivalent to an HD radio and, for purposes of this disclosure, included within the meaning or scope of each of the terms: "receiver," "radio frequency receiver" and "HD radio." Stated another way, the terms, "receiver" "radio frequency receiver" and "HD radio" should be construed as including HD-radio receivers and their equivalents, but also including wireless communications devices like the Blackberry® and equivalents thereof.

In view of the foregoing, the term "information" should be broadly construed to include data that identifies a song, such as a song title, the name of an artist or author who performed a song, a radio station and the like, when a song or other content starts and ends, and meta data. And, since such "information" can be conveyed and received via radio frequency signals or the Internet, the terms "signal" and "signals" should be broadly construed to include the delivery or reception of such items by way of either a modulated radio frequency carrier, such as an HD radio signal, a digital data stream carried over a data network such as the Internet, or both.

Those of ordinary skill in the art will recognize that the foregoing description is for purposes of illustration only. The true scope of the invention is set forth in the appurtenant claims.

What is claimed is:

1. A system comprising:
   a radio-frequency receiver configured to receive a first signal containing information in a data stream;
   a received data stream analyzer coupled to the radio-frequency receiver and configured to detect information in said data stream;
   a global position system (GPS) coupled to the received data stream analyzer, the GPS configured to determine a geographic location of the radio-frequency receiver responsive to receipt by the GPS of a signal from the received data stream analyzer; and
   an information correlator coupled to the received data stream analyzer and the GPS, and configured to correlate information in the data stream to a geographic location; wherein the information correlator is configured to select a prior geographic location of the radio-frequency receiver from a database of geographic locations whereat song titles were received by the radio-frequency receiver.

2. A system comprising:
   a receiver configured to receive a first signal containing information in a data stream;
   a received data stream analyzer coupled to the receiver and configured to detect information in said data stream;
   a global position system (GPS) coupled to the received data stream analyzer, the GPS configured to determine a geographic location of the receiver responsive to receipt by the GPS of a signal from the received data stream analyzer;
   an information correlator coupled to the received data stream analyzer and the GPS, and configured to correlate information in the data stream to a geographic location; and
   a display device coupled to the information correlator, wherein the information correlator is configured to display a map on the display device and to display on the displayed map, at least one geographic location where a song was received by the receiver.

3. The system of claim 2, further comprising:
   a data storage medium coupled to at least one of the radio-frequency receiver and the received data stream analyzer, the data storage medium configured to store data representing information in the data stream.

4. The system of claim 3, wherein the data storage medium comprises a received song title list database.

5. The system of claim 2, further comprising:
   a data storage medium coupled to the GPS, the data storage medium configured to store data representing a geographic location of the radio-frequency receiver determined by the GPS responsive to the GPS receipt of a signal from the received data stream analyzer.

6. The system of claim 2, wherein:
   the information is comprised of a song title and
   the information correlator is configured to correlate a prior geographic location of the radio-frequency receiver to a song title in a received song title database.

7. The system of claim 2, wherein the radio-frequency receiver is a hybrid digital radio receiver.

8. A system comprising:
   a radio-frequency receiver configured to receive a first signal containing information in a data stream;
   a received data stream analyzer coupled to the radio-frequency receiver and configured to detect information in said data stream;
   a global position system (GPS) coupled to the received data stream analyzer, the GPS configured to determine a geographic location of the radio-frequency receiver responsive to receipt by the GPS of a signal from the received data stream analyzer; and
   an information correlator coupled to the received data stream analyzer and the GPS, and configured to correlate information in the data stream to a geographic location; and
   a display device coupled to the information correlator, wherein the information correlator is configured to display a map on the display device and to display on the displayed map, a plurality of legs of a route, over which the radio-frequency receiver travelled and during which a plurality of songs were received by the radio-frequency receiver.

9. A system comprising:
   a receiver configured to receive a first signal containing information in a data stream;
   a received data stream analyzer coupled to the receiver and configured to detect information in said data stream;
   a global position system (GPS) coupled to the received data stream analyzer, the GPS configured to determine a geographic location of the receiver responsive to receipt by the GPS of a signal from the received data stream analyzer;
   an information correlator coupled to the received data stream analyzer and the GPS, and configured to correlate information in the data stream to a geographic location; and
   a display device having a touch-sensitive screen, the display device being coupled to the information correlator, which is configured to display a map on the display device and to display on the displayed map, a plurality of legs of a route, over which the receiver travelled and during which a plurality of songs were received by the receiver, the touch-sensitive screen being configured to be responsive to a tactile input above a leg of the route displayed on the display device and, output a route leg selection signal to the information correlator, the information correlator thereafter effectuating the display of a title of a song received by the receiver while the receiver was located along the leg selected by the tactile input.

* * * * *